United States Patent [19]
Tartaglia

[11] 3,888,280
[45] June 10, 1975

[54] BI-DIRECTIONAL PRESSURE BALANCED VALVE

[75] Inventor: Ralph W. Tartaglia, Bethel Park, Pa.

[73] Assignee: Rockwell International Corporation, Pittsburgh, Pa.

[22] Filed: Aug. 20, 1973

[21] Appl. No.: 389,687

[52] U.S. Cl.................. 137/630.13; 137/630.15
[51] Int. Cl............................................. F16k 1/32
[58] Field of Search...... 137/630.13, 630.14, 630.15

[56] References Cited
UNITED STATES PATENTS

| | | | |
|---|---|---|---|
| 1,870,293 | 8/1932 | Miller | 137/630.15 |
| 1,880,186 | 9/1932 | Knauf | 137/630.14 |
| 2,652,851 | 9/1953 | Schmidt et al. | 137/630.13 UX |
| 3,428,090 | 2/1969 | Hose et al. | 137/630.14 |
| 3,601,157 | 8/1971 | Milleville | 137/630.14 |

FOREIGN PATENTS OR APPLICATIONS

| | | | |
|---|---|---|---|
| 313,479 | 7/1919 | Germany | 137/630.14 |

Primary Examiner—Robert G. Nilson

[57] ABSTRACT

A bi-directional high pressure valve of the type wherein an auxiliary valve controls a pressure bleed passage through a main valve assembly, the main valve assembly being positively moved between open and closed positions by a power operated stem and being pressure balanced during opening and closing movement regardless of the direction of fluid flow through the valve. A control chamber space provided on the side of the main valve assembly opposite the main valve seat is connected by a check-valved fluid communication passage to the flow port closed by the main valve assembly to maintain the fluid pressure forces acting on opposite sides of the main valve assembly in substantial balance when the direction of fluid flow is opposite to the direction of closing movement of the main valve assembly.

2 Claims, 5 Drawing Figures

BI-DIRECTIONAL PRESSURE BALANCED VALVE

BACKGROUND OF THE INVENTION

This invention relates to bi-directional valves for high pressure fluid lines wherein a main valve assembly is positively moved between open and closed positions by a power device acting through a valve stem and particularly to such valves wherein regardless of the direction of fluid flow through the valve the main valve assembly is in a pressure balanced condition during opening and closing movement to reduce the force required of the power device moving the main valve assembly.

Certain embodiments of this invention will be described as incorporated in a valve of the type disclosed in U.S. letters Pat. No. 3,601,157 issued Aug. 24, 1971 to Milleville et al. The valve disclosed in that patent comprises a main valve assembly formed with a passage therethrough adapted to be closed or opened by an auxiliary valve member on a reciprocable valve stem. In that valve, when fluid flow is in a predetermined direction and the main valve assembly is in the closed condition, the auxiliary valve member is seated to close the passage through the main valve assembly and upstream fluid pressure introduced into a chamber in the valve body is applied to one side of the main valve assembly to augment the valve closing force. When that valve is opened, the auxiliary valve member is first unseated to permit the upstream fluid pressure from the chamber to bleed downstream to equalize the fluid pressure acting on opposite sides of the main valve assembly thereby reducing the force required to open the main valve assembly. When the patented valve is being closed the auxiliary valve member is seated to close the passage communicating the opposite sides of the main valve assembly and open another passage which introduces upstream fluid pressure into the aforesaid chamber to thereby augment the valve closing force.

Although the valve disclosed in U.S. Pat. No. 3,601,157 constituted a significantly improved design for the service for which it was intended, that design is unidirectional in the sense that the pressure equalization feature is provided in connection with fluid flowing in only one direction through the valve. In one mode of operation the pressure equalization feature of that design is also dependent upon fluid flow through a plurality of relatively small diameter passageways, the total flow area of which is such as to provide a relatively slow response to abrupt pressure changes on opposite sides of the main valve assembly.

The present invention constitutes an improvement over the art represented by that patented valve in that auxiliary valve controlled pressure balance is provided on opposite sides of the main valve assembly during both opening and closing movements of the main valve assembly with fluid flow in either direction through the valve. The present invention also provides means for rapidly responding to abrupt pressure changes on opposite sides of the main valve assembly.

A valve mechanism designed to retard the opening of a main valve member until an auxiliary valve element has been opened to equalize pressure in the inlet and outlet ports of a valve body is proposed in U.S. letters Pat. No. 3,624,753 issued Nov. 30, 1971 to R. S. Brumm. The proposed bi-directional embodiment of that patent involves the use of a complex valve structure which provides for continual communication of upstream pressure to one of two areas in the valve body to bias the main valve member to its closed condition and an auxiliary or pilot valve arranged to bleed the upstream pressure to the downstream port to thereby equalize the fluid pressure in the inlet and outlet ports of the valve body. The proposed design of that patent is intended to utilize upstream pressure to hold the main valve member in its closed condition until the fluid pressure is equalized in both lines leading to the valve.

The present invention utilizes a combination of a main valve assembly and an auxiliary valve element which is less complex than the combination proposed in U.S. Pat. No. 3,624,753 because it employs only a single pressure chamber to balance the pressure on opposite sides of the main valve assembly regardless of the direction of fluid flow through the valve. The pressure chamber is provided on the side of the main valve assembly opposite from its seat and the valve structure is arranged to maintain the chamber at the same fluid pressure as the valve flow passageway directly opposite the chamber to reduce the force required to open or close the main valve assembly. In certain applications of the present invention the upstream line pressure is used as an additional seating force on the main valve assembly but such force is not applied to prevent the main valve assembly from opening after the auxiliary valve is opened as proposed by the complex valve structure of U.S. Pat. No. 3,624,753. The present invention is also useful in controlling the flow of high temperature fluids since certain embodiments of this invention do not rely on the use of elastomeric sealing elements such as those upon which the proposed bi-directional embodiment of the Brumm patent is dependent and which are generally acceptable for use in controlling the flow of fluids at a temperature no greater than about 400°F.

It is therefore one object of the present invention to provide a valve for high pressure fluid lines which can be opened or closed under a pressure balanced condition regardless of the direction of fluid flow through the valve.

Another object of the invention is to provide a valve for high pressure fluid lines which includes a main valve assembly and an auxiliary valve member which functions to maintain the same pressure on opposite sides of the main valve assembly during opening and closing movement of the main valve assembly regardless of the direction of fluid flow through the valve.

Another object of the invention is to provide a valve for high pressure fluid lines which includes a main valve assembly and an auxiliary valve member which opens in response to an abrupt pressure change on one side of the main valve assembly to open a fluid passageway and balance the pressure forces acting on the opposite sides of the main valve assembly during opening and closing movement of the main valve assembly regardless of the direction of fluid flow through the valve.

A still further object of the invention is to provide a bi-directional pressure balanced valve for high pressure fluids which is not dependent upon the use of elastomeric type sealing elements and is therefore useful in controlling the flow of high pressure fluids at temperatures greater than 400°F.

Still further objects of the invention are to provide novel bi-directional valve assemblies having the common operational characteristics of the embodiments to

SUMMARY OF THE INVENTION

In one embodiment of the invention herein disclosed the valve may be substantially of the same physical construction as disclosed in said U.S. Pat. No. 3,601,157, so that the valve may operate in the same manner as disclosed in that patent when fluid is flowing in one direction through the valve, but the valve is made to operate under a pressure balanced condition with fluid flowing in the opposite direction by the provision of a special unidirectional passage between one of the valve flow ports and a fluid pressure chamber provided on the side of the main valve assembly opposite to the main valve seat. In another embodiment the structure is somewhat different in that the auxiliary valve member may have a lost motion connection with the valve stem and function as a check valve in association with the passage through the main valve assembly to maintain the same fluid pressure on opposite sides of the main valve assembly during opening and closing movements of that assembly regardless of the direction of fluid flow through the valve.

The present invention and the advantages provided thereby will be more fully understood upon further study of the following description of certain embodiments of the invention and the accompanying drawings.

DESCRIPTION OF THE DRAWINGS

In the drawings wherein like numerals represent like parts.

DESCRIPTION OF THE INVENTION

Figure 1:
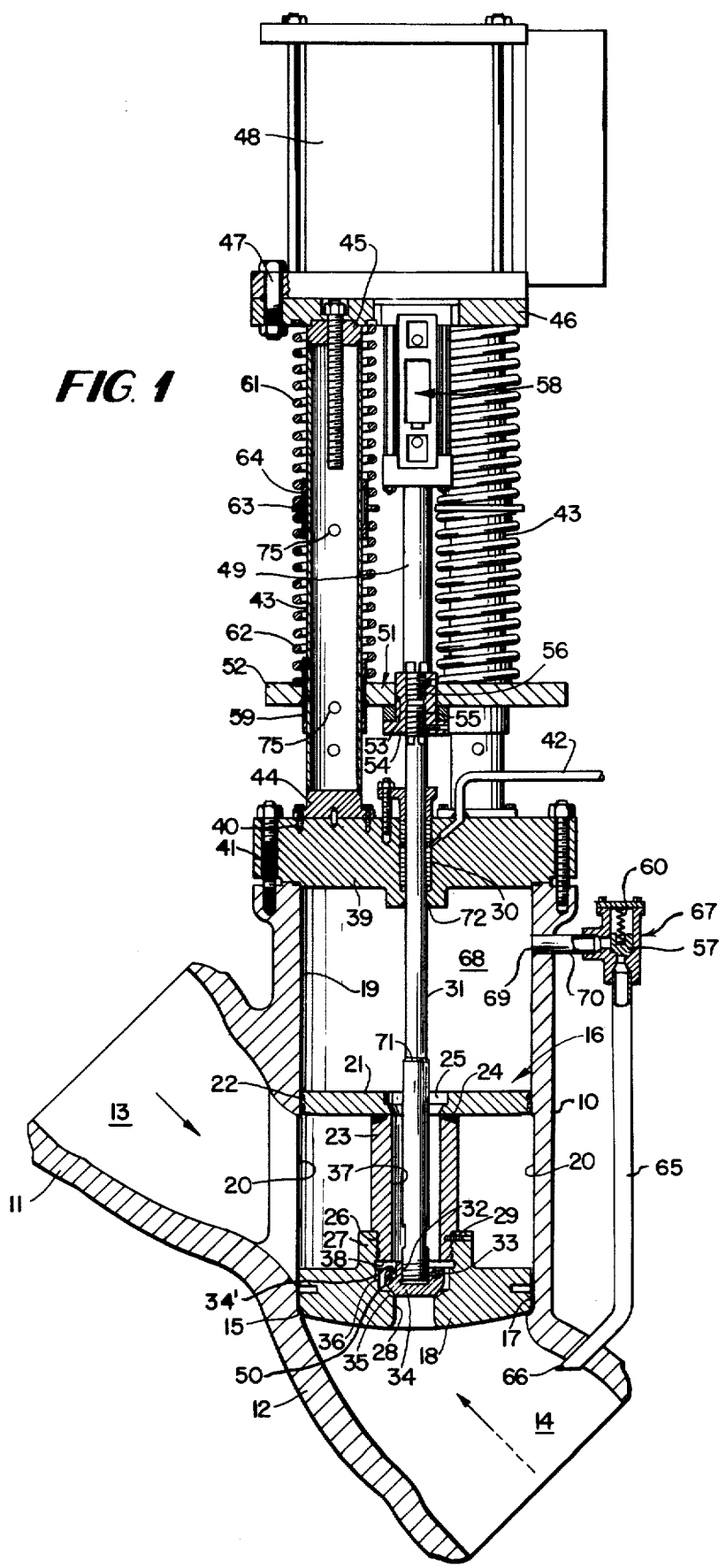
FIG. 1 is a side elevation partly broken away and in section showing a bi-directional flow valve according to one embodiment of the invention.

Referring to FIG. 1 a valve body 10 has aligned hollow end bosses 11 and 12 defining flow ports 13, 14 and an annular valve seat 15 provided between the flow ports 13 and 14 at the mouth of flow port 14. A valve control chamber 16 is formed within the body adjacent seat 15 with a cylindrical section 17 providing a slide guide for a main valve closure disc 18 when it moves to engage seat 15. Above cylindrical section 17 the body may be provided with a series of circumferentially spaced parallel ways 20 for slidably guiding the disc 18 above the annular valve seat 15.

Chamber 16 is formed with a cylindrical bore 19 slidably mounting a piston 21 having piston rings 22 in grooves in its external periphery slidably engaging the bore surface. Seat 15, cylindrical section 17 and bore 19 are coaxial. Piston 21 is rigidly connected to disc 18 by a concentric hollow shaft 23 that is fixed as by welding at 24 to the underside of piston 21 in surrounding relation to a central opening 25 through the piston. Shaft 23 is fixed at its lower end to disc 18 by a threaded connection 26 within a hollow upstanding boss 27 surrounding the upper end of a central through opening 28 in the disc. A set screw 29 locks disc 18 to shaft 23. The rigidly connected unit consisting of disc 18, shaft 23 and piston 21 will be referred to as the main valve assembly.

A valve stem 31 extends coaxially freely through piston opening 25 and shaft 23 and at its lower end has fixed thereon, as by a threaded connection 32 locked by screw 33, an auxiliary valve 34. Disc opening 28 is formed with a annular auxiliary valve seat 35 for valve 34 and above seat 35 is enlarged at 36 for freely accommodating valve 34. Valve 34 is of larger diameter than the bore 37 of shaft 23, and when valve 34 is in a closed position seated on seat 35 as in FIG. 1 it is longitudinally spaced from fixed annular surface 38 on the lower end of shaft 23. As will appear auxiliary valve 34 will abut surface 38 after predetermined upward displacement from seat 35, the arrangement providing an effective lost motion connection between valve stem 31 and disc 18 during the valve opening sequence. Auxiliary valve 34 is undercut to provide a annular groove or recess 34' exteriorly of the threaded connection 32 and a plurality of circular passageways 50 are provided around the circumference of valve 34 to provide a fluid communication passage between disc opening 28 and the bore 37 of shaft 23 when valve 34 abuts surface 38.

The upper end of chamber 16 is closed fluid tight by a header plate 39 secured to the body 10 as by bolts 41. Valve stem 31 extends slidably through an opening in plate 39 where it is surrounded by packing 30. A leak off conduit 42 is provided in fluid communication with the packing 30 to bleed off leakage through the lower packing and prevent leakage to the atmosphere.

The foregoing structure may be similar to that disclosed in U.S. letters Patent to Milleville et al No. 3,601,157 to which reference may be made for more detail.

A plurality of parallel tubular posts 43 are removably secured at their lower ends 44 to plate 39 as by bolts 40. At their upper ends 45 they are fixed to a bridge plate 46 upon which is mounted, as by bolts 47, a pneumatic motor assembly 48 having a downwardly extending reciprocable output shaft 49 centered with stem 31.

Above header plate 39 a yoke assembly 51 is removably secured to the upper end of valve stem 31. Yoke assembly 51 comprises a transverse plate 52 having a central bore 53 through which extends a coupling sleeve 54 fixed to plate 52 and having a threaded connection 55 to the upper end of stem 31. Coupling sleeve 54 is similarly threadedly connected at 56 to motor output shaft 49 which extends downwardly through a dashpot assembly 58 which may be of the reversible fluid and piston type disclosed in Hose et al. letters Pat. No. 3,531,078 or Parsons et al. letters Pat. No. 846,692. A piston fixed to the motor output shaft 49 moves in a cylindrical bore provided in the main body of dashpot assembly 58 and controls the rate of opening and closing of the valve by motor 48.

In the disclosed embodiment there are four posts 43 (two shown) evenly spaced around the axis of the valve stem. Any desired number of posts may be provided for stability. Yoke plate 52 has secured thereto guide sleeves 59 slidable on posts 43 whereby the yoke assembly is slidably mounted on posts 43. Each post is surrounded by two coiled compression springs 61 and 62 arranged in series with their adjacent ends seated on the flange 63 of a guide sleeve 64 slidably mounted on post 43. Upper spring 61 extends between plate 46 and sleeve 64, and lower spring 62 extends between sleeve 64 and yoke plate 52. Two springs 61, 62 are used in series on each post because a single spring of the available diameter would be so long as to be in danger of buckling when compressed.

A conduit 65 extends from a terminal opening 66 within valve flow port 14 through the body wall to a check valve 67 which is connected in fluid communication with the control chamber space 68 rearward of the main valve assembly by a conduit 70. Check valve 67 is provided with a piston type closure element 57 and a spring 60 arranged to bias the element 57 to its closed position. The piston type closure element is normally biased to its closed position and will prevent fluid flow through the conduit 65 as long as the fluid pressure in conduit 70 is greater than the fluid pressure in conduit 65. The closure element will however open to permit fluid flow from conduit 65 to conduit 70 as soon as the fluid pressure in flow port 14 and conduit 65 is high enough to exert a force on the closure element 57 which will overcome the fluid pressure in conduit 70 and compress the spring 60. The check valve 67 and conduits 65 and 70 therefore constitute a unidirectional passage providing fluid communication between valve flow port 14 and chamber space 68 when the fluid pressure in flow port 14 is greater than the fluid pressure in chamber space 68 while preventing fluid flow from chamber space 68 to flow port 14.

The embodiments of this invention will be described as they are operated to open and close the main valve assembly with fluid flowing in either direction through the flow ports 13, 14 and, in certain instances, with respect to maintaining the fluid pressure forces acting on opposite sides of the main valve assembly in substantial balance when the main valve assembly is in the closed position. Although there is no flow through the valve when the main valve assembly is in the closed position, in practice a fluid pressure differential would exist across the flow ports 13, 14 which would produce fluid flow from one flow port to the other upon opening of the valve. For purposes of simplification, the terms "fluid flow" and "direction of fluid flow" will be used herein to define the actual direction of fluid flow when the valve is open and, when the valve is closed, the direction fluid would flow under the influence of the pressure differential established across the flow ports 13, 14 if the valve were moved to the open position.

The valve assembly of FIG. 1 is shown in the fully closed position. Main valve disc 18 is fully seated at 15, and auxiliary valve 34 is fully seated at 35. Closure is tightly effected by action of the pneumatic motor 48 in pushing valve stem 31 down to transmit the valve seating force through the auxiliary valve 34 to main valve disc 18, and the motor 48 is maintained energized to exert this closing force while the valve is closed.

When flow port 13 is in the inlet flow port as shown by the solid arrow in FIG. 1 and the valve is closed as additional closing force is exerted by the fluid pressure in chamber space 68 acting on piston 21 which is rigid with the main valve disc 18. Under these conditions upstream fluid pressure in the chamber space below the piston 21 will leak past piston rings 22 into chamber space 68 until the fluid pressure in that space 68 is the same as upstream fluid pressure in the flow port 13. Since the pressure in chamber space 68 acts upon the entire upper surface of the piston 21 it exerts a strong downward valve seating force that augments the tight seating of both the main valve disc 18 and auxiliary valve 34. The fluid pressure in chamber space 68 also acts through conduit 70 to effect an additional closing force on the closure element 57 of check valve 67. Piston rings 22 provide sliding engagement between the piston 21 and bore 19, but they do not provide a gastight seal so that upstream fluid pressure in flow port 13 will leak past the piston rings 22 and pressurize chamber space 68. There will be no fluid flow or pressure exchange between chamber space 68 and outlet flow port 14, because of the fluid tight seating of main valve disc 18, auxiliary valve 34, and unidirectional check valve 67.

When it is desired to open the valve to permit fluid flow from inlet flow port 13 to outlet flow port 14, the pneumatic motor 48 is actuated to move stem 31 upwardly and raise auxiliary valve 34 off of seat 35. Upward movement of valve 34 provides fluid communication between chamber space 68 and valve outlet flow port 14 through opening 28 and the bore of shaft 23. This communication permits the upstream fluid pressure in chamber space 68 to bleed to outlet flow port 14 thereby providing the same fluid pressure force on opposite sides of the main valve assembly by the time the valve 34 solidly abuts surface 38. Further upward movement of valve stem 31 with auxiliary valve 34 contacting surface 38 lifts the main valve disc off seat 15 and the valve assembly rises until the annular surface 71 on valve stem 31 engages the annular back seat 72 on the bottom of header plate 39 to further seal against loss of fluid pressure upwardly along the valve stem. Because the valve has become pressure balanced after opening of the auxiliary valve, the load on stem 31 required to lift the valve assembly is greatly reduced. Engagement of the stem backseat stops upward movement of valve disc 18 at about the former level of piston 21, so that fluid flow is now unobstructed through the valve body.

Should fluid flow be in the opposite direction, with flow port 14 as the inlet or upstream flow port as indicated by the dotted line arrow in FIG. 1 and the valve closed, motor 48 exerts a constant downward valve closing force as before. The space 68 is now pressurized through conduits 65 and 70 substantially at the upstream pressure of flow port 14, as permitted by now open check valve 67, for providing substantial balance between the fluid pressure forces acting downwardly on piston 21 and valve 34 and upwardly on disc 18 and valve 34. Under such pressure balanced conditions the seating force required of the motor to provide a pressure tight seal at the seats 15 and 35 is greatly reduced from that which would be required if the fluid pressure acting downwardly on piston 21 and valve 34 was not balanced with the pressure acting upwardly on disc 18 and valve 34 and the motor had to seat the disc 18 and valve 34 against the upstream fluid pressure of inlet flow port 14. In practice there will be some leakage of pressure from chamber space 68 past the piston rings 22 into the outlet flow port 13, but this is not objectionable and the rate is so slow that any loss is quickly restored by the upstream pressure connection provided by conduits 65, 70.

When it is desired to open the valve with flow port 14 as the inlet, motor 48 is actuated to lift stem 31. This lifts auxiliary valve 34 which after predetermined movement solidly engages surface 38 to displace the pressure balanced main valve assembly to fully open position.

When the motor 48 acts to open the valve, the yoke will be pulled upwardly to compress springs 61, 62 which will thereby be energized and thus exert a constant strong resilient bias tending to move the valve to closed condition. Should the air supply line to motor 48 break, or the air supply otherwise fail, the motor lifting force on the valve stem will be disabled and springs 61, 62 will immediately act to slam the valve shut to the FIG. 1 condition.

An important feature of this arrangement of the subassembly of the pneumatic motor 48 and compression springs 61, 62 on the common supporting plate 46 is that the entire actuating mechanism including the yoke assembly 51 may be removed from the header plate 39 without unloading the springs merely by inserting suitable diametral pins in holes 75 in the posts 43, removing bolts 40 to free the posts 43 from the header plate, and detaching stem 31 from coupling 54 by applying a wrench to the flats near coupling 54.

During opening or closing movement of the main valve assembly of FIG. 1 with fluid flowing in either direction through the valve, the check valve element 57 is free to open under influence of a pressure increase in flow port 14 to provide a fluid communication passage between flow port 14 and chamber space 68 via conduits 65, 70, to maintain the fluid pressure forces acting on opposite sides of the main valve assembly in substantial balance. The diameter of bypass conduits 65, 70 is selected so that the relation between displacement flow rate therethrough as the main valve assembly is moved to its seat, which is a function of closure speed, and the pressure leakage rate at the piston rings will not cause high pressure drops in the bypass conduit such as would create valve opening forces tending to oppose the closing action of the pneumatic motor.

Figure 2:
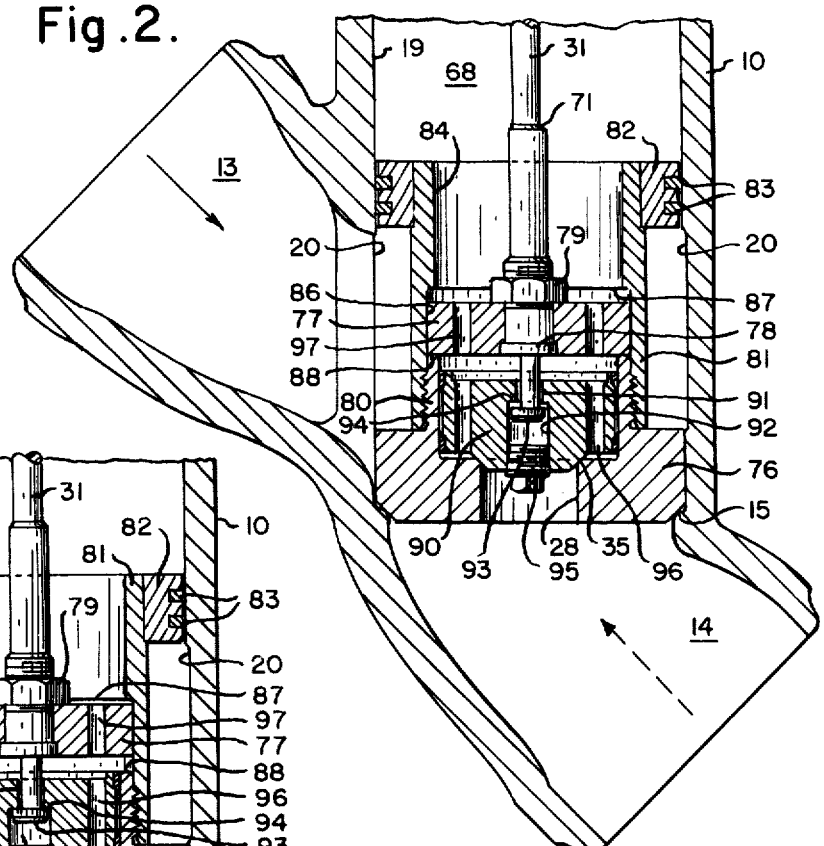
FIG. 2 is a fragmentary view mainly in section illustrating a further embodiment of this invention.
Figure 3:
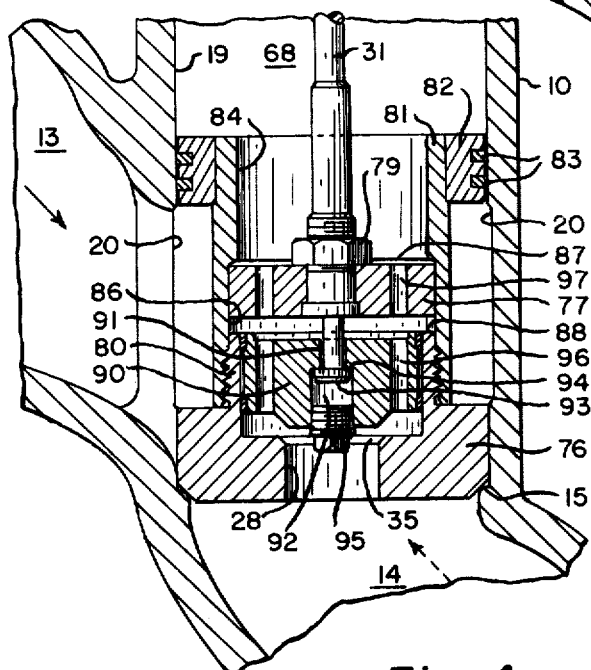
FIG. 3 is a fragmentary view mainly in section showing the valve of FIG. 2 with the valve stem in lifting engagement with a combination auxiliary and check valve and with the main valve assembly.
Figure 4:
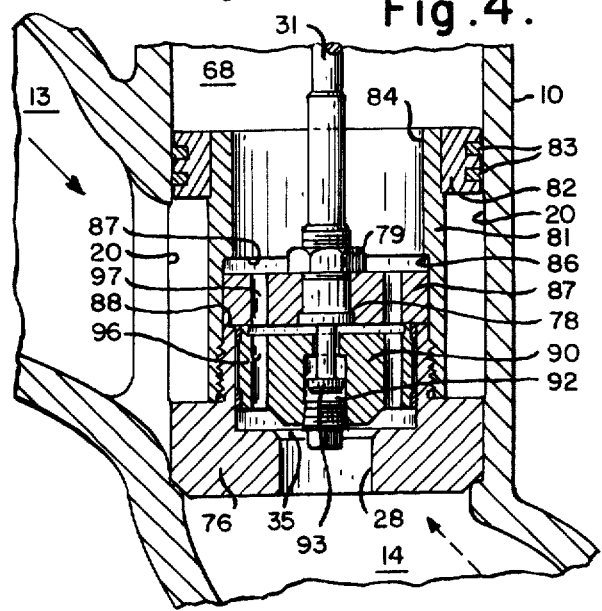
FIG. 4 is another fragmentary view like that of FIG. 3 but showing the main valve assembly in closed condition and the auxiliary valve displaced upwardly from its seat.

FIGS. 2–4 illustrate an embodiment of the invention which incorporates an internal check valve arrangement to enable a main valve assembly to be opened or closed under a pressure balanced condition regardless of the direction of fluid flow through the valve. The same numerals are used in FIGS. 2–4 to identify parts which are similar to and function in the same manner as parts which were described for the FIG. 1 embodiment. In FIG. 2 only that portion of the valve assembly below the header plate is illustrated, the valve actuating mechanism above the header plate being the same in construction and operation as the actuating mechanism described for the FIG. 1 embodiment.

In FIG. 2, which shows all components of the valve in their closed positions, a main valve disc 76 having a through opening 28 and auxiliary valve seat 35 is seated on the annular valve seat 15 by the motor 48 forcing valve stem 31 downwardly. A collar 77 is mounted at a longitudinally fixed position on stem 31 between a shoulder 78 and a nut 79. The collar 77 engages surface 88 of the upstanding boss 80 of disc 76 so that the force of the motor is transmitted through stem 31 and collar 77 to the disc 76 of the main valve assembly. Disc 76 is threadedly engaged to the lower end of a concentric hollow shaft 81 which carries a piston 82 provided with piston rings 83 sized to slidably engage the cylindrical bore 19. The upper portion of shaft 81 has an internal diameter 84 which is less than the diameter of the collar 77 and the shaft 81 is counterbored as shown at 86 to receive the collar 77. The diameter of the counterbore is sufficiently large to permit the collar to move relative to the shaft between the shoulder 87 and the upper surface 88 of boss 80.

An auxiliary valve member 90 is formed with an upwardly open recess provided by a bore 91 and counterbore 92. Valve stem 31 extends freely, slidably through bore 91 with an enlarged flange 93 positioned in counterbore 92 and adapted to abut the axially facing annular surface 94 of valve member 90 when the valve stem 31 is lifted a predetermined distance. The counterbore 92 is sealed by a plug 95 threadedly engaged with the lower end of the counterbore. A series of circumferentially spaced apertures 96 and 97 are respectively provided to auxiliary valve element 90 and collar 77 to provide a fluid communication passage through these elements when the auxiliary valve element 90 is displaced from the valve seat 35.

In FIGS. 2–4 the auxiliary valve member 90 serves as a combination auxiliary valve and check valve element provided internally of the rigidly connected main valve assembly which in this embodiment is comprised of the main valve disc 76, shaft 81 and piston 82.

With the valve closed and flow port 13 constituting the inlet port so that fluid flow into the valve is in the direction of the solid line arrow as shown in FIG. 2, upstream fluid pressure leaking from inlet flow port 13 through piston rings 83 pressurizes chamber space 68 thereby providing an additional seating force which acts downwardly on the main valve assembly to augment the closing force of the motor 48 as transmitted through stem 31. The upstream fluid pressure of chamber space 68 acts through the apertures 97 in collar 77 and the bore of hollow shaft 81 to urge the combination auxiliary and check valve member 90 downwardly into sealing engagement with the auxiliary valve seat 35 in the disc opening 28.

When the valve is to be opened with flow port 13 as the inlet port, stem 31 is lifted by pneumatic motor 48 until flange 93 abuts the annular surface 94 and lifts the auxiliary valve member 90 off of seat 35. As soon as the auxiliary valve member 90 is lifted off of its seat 35 a fluid communication passage is established between chamber space 68 and outlet flow port 14 by means of the hollow interior of shaft 81 apertures 97 through collar 77, apertures 96 through valve member 90, and passage 28 through disc 76. The upstream pressure of chamber space 68 bleeds through this fluid communication passage into outlet flow port 14 thereby substantially equalizing the fluid pressure forces acting on opposite sides of the main valve assembly. Further upward movement of the valve stem 31 results in solid abutment of the collar 77 with the shoulder 87 provided on shaft 81 as shown in FIG. 3 and the positively applied force of the motor lifts the now pressure balanced main valve assembly off of seat 15 to its fully opened position with only a limited lift force required of the motor 48 as in the embodiment of FIG. 1.

When the main valve assembly reaches its fully open position, the main valve assembly will be suspended from the stem 31 with the shoulder 87 in abutment with the upper surface of collar 77. The combination auxiliary valve and check valve member 90 will also be suspended with its annular surface 94 abutting flange 93 and with the previously described fluid communication passage through the main valve assembly open to insure that the pressure forces acting on opposite sides of the main valve assembly are substantially balanced.

To close the valve with flow port 13 as the inlet port, motor 48 is energized to move stem 31 downwardly until collar 77 engages the upwardly disposed surface 88 of main valve disc 76 at which time the main valve disc 76 is positively moved to seat in closed condition on seat 15. The auxiliary valve member 90 being positioned within the main valve assembly will, of course, move with the main valve assembly but sufficient clearance is provided between the main valve disc 76 and collar 77 to permit the auxiliary valve member 90 to move freely relative to the stem 31 and the auxiliary valve seat 35 provided on main valve disc 76. When the main valve assembly has been seated by stem 31 auxiliary valve member 90 will be moved toward the seat 35 by the upstream fluid pressure leaking through piston rings 83 into chamber space 68 and will be tightly seated by the upstream fluid pressure acting on the upper surface of the auxiliary valve member.

When flow port 14 is the inlet port so that fluid flow is opposite to the direction of closing movement of the valve stem 31 as indicated by the dotted line arrow in FIGS. 2–4, the main valve assembly is closed by contact of collar 77 with the upper surface 88 of main valve disc 76 as in FIG. 2, but under this condition the upstream fluid pressure of flow port 14 will unseat auxiliary valve element 90 with a check valve action and displace it upwardly until it leaves seat 35 and abuts the undersurface of collar 77 as illustrated in FIG. 4. The upstream fluid pressure of flow port 14 will be transmitted through opening 28, apertures 96, 97, and the hollow interior of shaft 81 to provide chamber space 68 with a fluid pressure substantially equivalent to that in the upstream flow port 14, thereby placing the main valve assembly in substantial pressure balance. There will be a continuing small leak of pressure from chamber space 68 through piston rings 83 to outlet flow port 13 but this will be negligible during operation and any loss of pressure in chamber space 68 is continually replenished.

When the valve is to be opened with flow port 14 as the inlet port, motor 48 displaces stem 31 upwardly to engage collar 77 with the shoulder 87 and the pressure balanced main valve assembly including auxiliary valve member 90 is lifted off the seat 15 and positively moved to fully open condition without undue load on the valve stem 31.

During opening or closing movement of the main valve assembly of FIGS. 2–4 with fluid flowing in either direction through the valve, the combination auxiliary valve and check valve member 90 is free to open under influence of a pressure increase in flow port 14 to provide a fluid communication passage between flow port 14 and chamber space 68 via opening 28, apertures 96, 97 and the hollow interior of shaft 81, to maintain the fluid pressure forces acting on opposite sides of the main valve assembly in substantial balance. This mode of operation is essentially equivalent to that previously described for the FIG. 1 embodiment with the exception that the fluid communication passage between the flow port adjacent the main valve seat and the control chamber rearward of the main valve assembly is provided internally of the main valve assembly.

The main valve assembly of FIGS. 2–4 has also been modified to accommodate the use of collar 77 slidably received in bore 86 of hollow shaft 81 to provide a lost motion connection between stem 31 and the main valve assembly and serve as the sole means for moving the main valve assembly toward or away from the seat 15 by engagement with the surface 88 of main valve disc 76 or the shoulder 87 provided internally of shaft 81. This structure permits the use of a massive collar 77 longitudinally fixed to a valve stem of relatively large diameter to effect opening and closing movement of the massive main valve assembly while permitting the use of a relatively light weight auxiliary valve member 90 which is free to move as a pressure responsive piston type check valve in the cylindrical bore provided by the upstanding boss 80 of main valve disc 76. The lost motion connection between the auxiliary valve member 90 and the stem 31, i.e. the axial distance the valve member can move relative to the stem before engaging the undersurface of the collar 77 or the enlarged flange 93 of stem 31 enables the valve member 90 to move freely relative to the stem and the main valve assembly as a fluid pressure responsive check valve element.

The lost motion connection between the main valve assembly and valve stem 31, i.e. the axial distance the collar 77 can move relative to the main valve assembly before contacting the shoulder 87 of shaft 81 on the surface 88 of main valve disc 76, is arranged to enable the main valve assembly to move a greater distance relative to the valve stem than the valve member 90. This is to ensure that the main valve assembly will move forward of the valve member 90 to open passage 28 in the event of a fluid pressure decrease in flow port 14 during closing movement of the main valve assembly with flow port 13 as the inlet port to balance the pressure forces acting on opposite sides of the main valve assembly. The fluid pressure in flow port 14 will drop abruptly if there is a break in the fluid pressure line downstream of the flow port 14 or if the line is opened to another flow loop of lower pressure.

Figure 5:
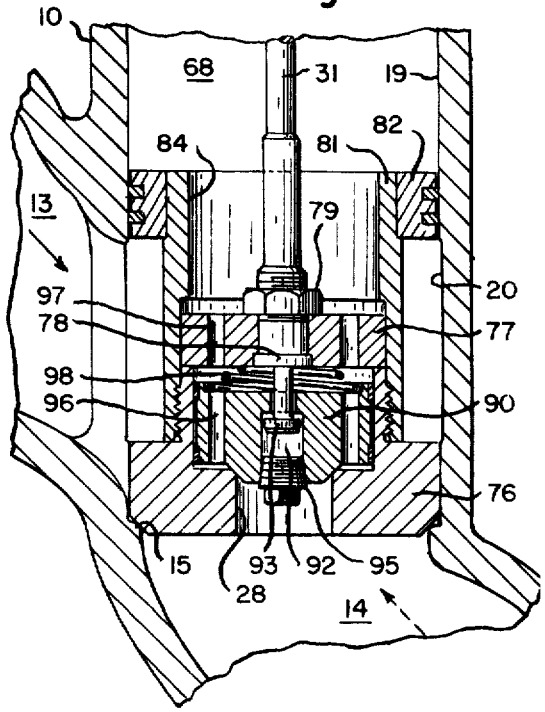
FIG. 5 is a fragmentary view similar to FIG. 2 but showing a modification wherein a light spring balances the weight of the auxiliary valve member.

As shown in FIG. 5 a light compression spring 98 may be provided between auxiliary valve member 90 and the undersurface of collar 77 in the FIG. 2–4 embodiment. The spring 98 would be useful in those instances where the valve body 10 may be installed at some angle other than that which is shown in FIGS. 2–4, for example upside down, where the spring 98 which should be strong enough to counterbalance the weight of the relatively lightweight auxiliary valve member 90 would eliminate any tendency of valve member 90 to unseat due to its own weight during operation. Although spring 98 should be strong enough to counterbalance the weight of the auxiliary valve member 90 the force applied by spring 98 should be light enough that it will not noticeably effect the ability of auxiliary valve 90 to be readily displaced from its seat 35 by a pressure increase in flow port 14.

Each of the previously described embodiments of this invention provide lost motion connecting means between the main valve assembly and the valve stem and a pressure responsive check valve element in a passageway providing fluid communication between the valve flow port closed by the main valve assembly and that portion of the valve control chamber rearward of the main valve assembly. The combined effect of these two features constitute an important part of this invention since they function in response to a significant pressure change on one side of the main valve assembly to maintain the pressure forces acting on opposite sides of the main valve assembly in substantial balance.

In the FIG. 1 embodiment, a significant increase in the fluid pressure at flow port 14 will displace check valve element 57 to provide fluid communication between flow port 14 and chamber space 68 until the pressure forces acting on opposite sides of the main valve assembly are substantially balanced and spring 60 returns the check valve element to its closed position.

In the FIG. 2–5 embodiment, the auxiliary valve member 90 is provided as a check valve element internally of the main valve assembly to open the passage 28 under influence of a substantial pressure increase in flow port 14 and provide fluid communication between flow port 14 and chamber space 68.

In the FIG. 1 embodiment, the space provided between auxiliary valve 34 and surface 38 provides a lost motion connection between the main valve assembly and the auxiliary valve 34 fixed to the valve stem 31. In the FIG. 2–4 embodiment collar 77 is arranged to engage axially spaced oppositely disposed surfaces 87 and 88 to provide a lost motion connection between the main valve assembly and the valve stem 31. In both embodiments, when the direction of fluid flow through the valve is opposite to the direction of opening movement of the valve stem as indicated by the solid line arrows in the drawings, the lost motion means connecting the main valve assembly to the valve stem permit a predetermined movement of the auxiliary valve member to balance the fluid pressure forces acting on opposite sides of the main valve assembly before the main valve assembly is moved away from its seat by the valve stem. Under the same flow condition when the main valve assembly is being moved to the closed position, the same lost motion connecting means permits the main valve assembly to travel forward of the auxiliary valve member under influence of an abrupt fluid pressure decrease downstream of the main valve assembly to balance the pressure forces acting on opposite sides of that assembly. The structure of the FIG. 2–4 embodiment provides for a more rapid response to a downstream pressure decrease than the FIG. 1 embodiment. This is primarily due to the provision of the check type auxiliary valve member 90 and the arrangement of the apertures 96, 97 which are provided in greater number and diameter than the circular passageways 50 provided through the auxiliary valve 34 of the FIG. 1 embodiment.

Both embodiments therefore provide a pressure tight seal when they are in the closed position with flow port 13 as the inlet and, in all other modes of operation, regardless of the direction of fluid flow through the valve, both embodiments provide pressure responsive fluid communication between the flow port closed by the main valve assembly and the control valve chamber spaced rearward of the main valve assembly to maintain the fluid pressure forces acting on opposite sides of the main valve assembly in substantial balance.

The invention may be embodied in other specific forms without departing from the spirit or essential characteristics thereof. The previously described embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed we defined as follows:

1. A valve assembly comprising: a body having two flow ports fluidly connected by a cylindrical valve control chamber; a first annular valve seat on the body between the control chamber and one of the flow ports; a cylindrical valve closure disc in the chamber having a first seating surface on the lower portion thereof and axially movable therewithin between an open position wherein said first seating surface is spaced from the first valve seat to permit fluid flow between the ports and a closed position wherein said seating surface sealingly engages said first annular valve seat to prevent flow past the seat between the ports; a cylindrical first bore coaxially formed in the upper portion of the closure disc; a hollow member rigidly coaxially connected at a lower end to the closure disc, said hollow member having an enlarged downwardly opening second bore at the lower end adjacent the first bore and defining therewith an annular chamber with axially spaced surfaces; means carried by the hollow member in axially spaced relationship to said closure disc, said means slidably engaging the surfaces of said control chamber and guiding said closure disc for axial movement in said control chamber between said positions; an axial fluid passage through said closure disc connecting said bores with said one of the flow ports and defining a supplemental flow path between said one of said flow ports and said control chamber; a second annular valve seat on the closure disc between the fluid passage and coaxial with the first bore; a cylindrical check valve having an outer surface slidably guidably supported in the first bore, said check valve having a second seating surface thereon engageable with the second valve seat and normally adapted to open or close said fluid passage through said closure disc in response to pressure changes in said ports and said control chamber; a valve stem; means for moving said valve stem in opposite directions; an actuator member slidably supported in the second bore and connected to said valve stem for lost motion movement between said axially spaced surfaces; fluid passages associated with the check valve and the actuator member for providing fluid communication therethrough between said one of said ports and the control chamber; end means projecting from the actuator member freely slidably associated with the check valve at a second lost motion connection, whereby said check valve is isolated from any guiding influence of the stem or the actuator member during lost motion movement at the second lost motion connection, said end means effective to lift the check valve from said second valve seat after said lost motion movement at said second lost motion connection.

2. In a bidirectional high pressure balanced valve, a valve body having a cylindrical valve control chamber; first and second flow ports communicating with the chamber at axially spaced locations therealong; a first annular valve seat on the body between the control chamber and said first flow ports; a cylindrical valve closure disc disposed in the chamber, a first annular seating surface on the lower portion of the closure disc sealingly engageable the first valve seat, said closure disc being axially movable in said control chamber between an open position wherein said seating surface is spaced from the first valve seat to permit fluid flow between the ports and a closed position wherein said seating surface sealingly engages said first annular valve seat to prevent flow past the seat between the ports; an axial passage formed through the closure disc; a cylindrical counterbore coaxially formed in the upper portion of the closure disc; a hollow shaft rigidly coaxially connected at a lower end to the closure disc, a second counterbore formed at the lower end of the shaft adjacent the first counterbore, said second counterbore having a larger diameter than the first counterbore, the base of the second counterbore and the top surface of the closure disc defining an annular chamber with axially spaced surfaces; a piston rigidly connected to the shaft in axially spaced relationship to said closure disc, said piston slidably engaging the surfaces of said control chamber and guiding said closure disc and said collar for axial movement in said control chamber between said open position and said closed position; a frusto-conical second valve seat on the closure disc formed coaxially with axial passage and the first counterbore; a cylindrical check valve having a central opening and an outer cylindrical surface slidably guidably supported by the inner cylindrical surface of the first counterbore, said check valve having a downwardly projecting conical end engageable with the seat and adapted to open or close said fluid passage through said closure member in response to pressure changes in said inlet port and said control chamber; a valve stem; means for moving said valve stem in opposite directions; a collar slidably supported in the second counterbore and connected to said valve stem for lost motion movement between the axially space surfaces of said base and said top surface; axial fluid passages on the check valve and the collar for permitting fluid communication on said first port and the control chamber; a lower end on the stem projecting freely through said central opening in the check valve at a second lost motion connection, whereby said check valve is isolated from the guiding influences of the stem during lost motion movement at the second lost motion connection, said stem having an enlarged terminal end engaging the lower surface of the check valve adjacent the central opening so as to be effective to lift the check valve from said second valve seat after said last mentioned lost motion movement.

* * * * *